May 18, 1937. T. C. KANE 2,080,824
VALVE
Filed Dec. 13, 1933
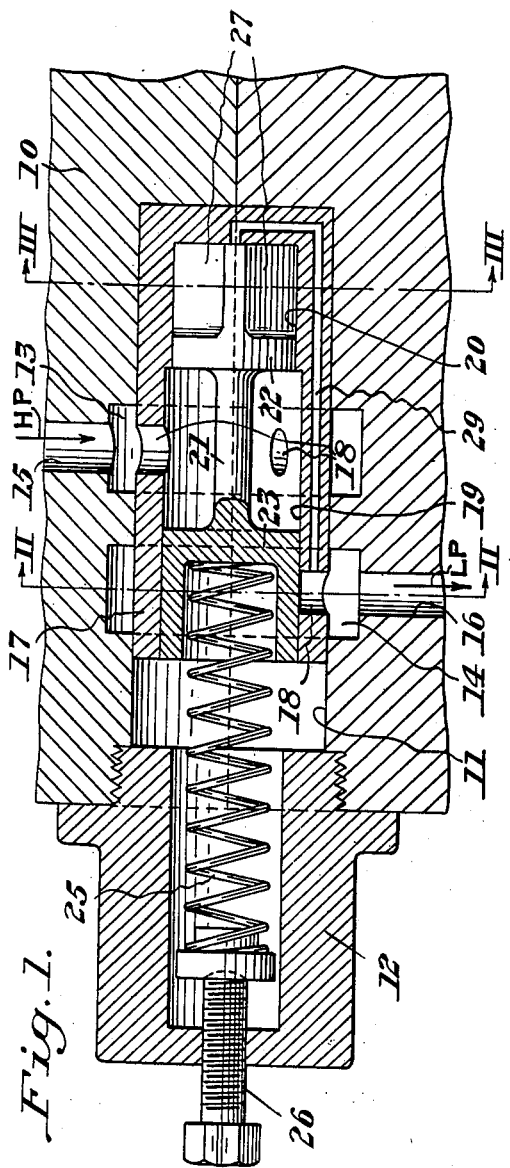
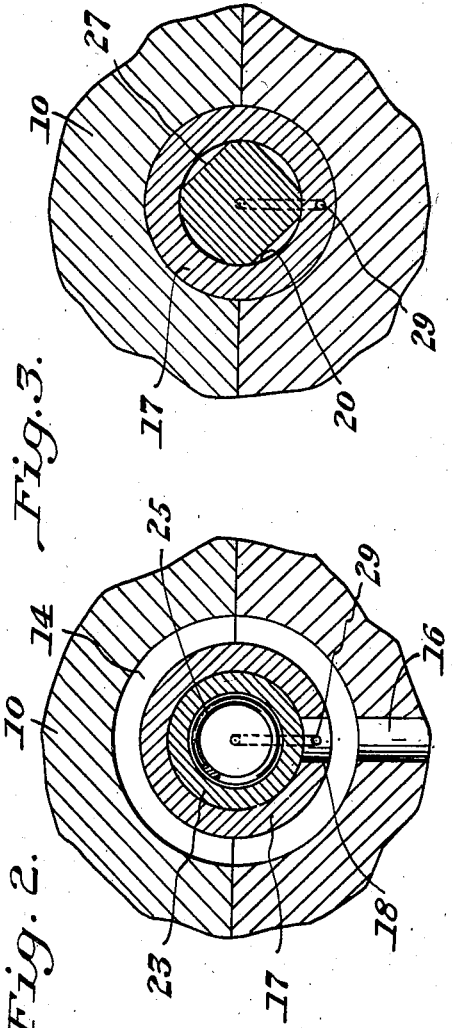
INVENTOR
Thomas C. Kane
by his attorneys
Byrnes, Stebbins, Parmelee & Blenko Patented May 18, 1937

2,080,824

UNITED STATES PATENT OFFICE 2,080,824

VALVE

Thomas C. Kane, Youngstown, Ohio, assignor to The Commercial Shearing & Stamping Company, Youngstown, Ohio, a corporation of Ohio Application December 13, 1933, Serial No. 702,183

10 Claims. (Cl. 137—53)

My invention relates to valves and, particularly to relief valves for unloading hydraulic systems operating under pressure when the pressure reaches a predetermined value.

The common type of relief valve now in use comprises a spring-loaded plunger subject to the pressure to be relieved. The plunger is operated when the pressure exceeds a predetermined value, to uncover a relief port. The relief valve is kept open as long as the excess pressure exists, but the escaping fluid is always subject to the maximum pressure. In numerous applications, it is undesirable to circulate fluid continuously through the relief valve under maximum pressure. In the first place, considerable power is consumed, and second, the fluid is unduly heated by friction so that it deteriorates more rapidly than would otherwise be the case. I have invented a relief valve which operates in response to the development of a predetermined pressure and, when operated, is effective to lower the pressure on the escaping fluid to a very small value so that the power requirements and heating of the fluid are very much reduced and all objections to continued operation with the valve in relief or by-passing position, are removed.

For a complete understanding of the invention, reference is made to the accompanying drawing illustrating a present preferred embodiment.

In the drawing:

Figure 1 is a longitudinal, sectional view showing a relief valve incorporating the present invention;

Figure 2 is a transverse sectional view taken substantially along the line II—II of Figure 1; and Figure 3 is a similar view taken along the line III—III of Figure 1.

The relief valve of my invention comprises a body or casing 10 having an axial bore 11 therethrough closed by a plug cap 12. Annular enlargements 13 and 14 of the bore 11 are formed in the casing 10. An inlet port 15 intersects the enlargement 13 and an outlet port 16 similarly intersects the enlargement 14.

A sleeve 17 is seated in the bore 11 and has radial holes 18 connecting its interior with the enlargements 13 and 14. The sleeve 17 has a bore 19 adjacent its open end and a bore 20 of smaller diameter adjacent its closed end.

A plunger 21 is reciprocable in the sleeve 17. The plunger 21 has a piston 22 seated in the bore 20 and a piston 23 slidable in the bore 19. A compression spring 25 is seated in the open end of the piston 23 and abuts against an adjusting screw 26 threaded into the closed end of the plug cap 12. The piston 22 has flattened surfaces 27 which permit the passage of fluid therearound at a certain plunger position. A drain passage 29 for the bore 20 extends from the extreme end of the bore through the wall of the sleeve 17 to the hole 18 which communicates with the enlargement 14.

It will be apparent that the relief valve of my invention is intended to be used in a hydraulic system including a source of fluid under high pressure, such as a supply line leading from the pump to a device adapted to be hydraulically operated, such as a hydraulic jack, and a low pressure side, such as a storage reservoir, into which fluid is discharged at low pressure and from which fluid is supplied to the pump. The port 15 is connected to the high pressure side of the system and the port 16 to the low pressure side. In describing the operation of the invention, it will be assumed that the parts are in their illustrated positions and that connections to the system are made as above mentioned. The port 15 and the enlargement 13 are subject to the normal operating pressure of the system, as well as the space between pistons 22 and 23, through the openings 18 in the wall of the sleeve 17. It has been stated that the diameter of the piston 22 is smaller than that of the piston 23. The operating pressure on the system, therefore, exerts a thrust on the plunger 21 tending to move the latter to the left in Figure 1. Such movement, of course, is opposed by the spring 25. Since the force tending to move the plunger 21 is only the difference between the forces exerted on the pistons 22 and 23, respectively, the spring 25 need not be very strong. As long as the operating pressure remains below a predetermined value, of course, the parts of the valve remain in their illustrated positions. When the pressure rises above the predetermined value, however, the fluid pressure on the plunger 21 overcomes the force of the spring 25 and the plunger moves to the left.

As the plunger 21 moves, the first result is that the piston 22 moves out of the bore 20. Fluid under pressure thus flows behind the piston 22 and since the forces on both sides of the piston are then substantially equalized, the plunger 21 is urged to the left by the full force of the pressure on the entire surface of the piston 23. The operating force being thus increased, movement of the plunger is accelerated. Further movement of the plunger uncovers the hole 18 leading to the enlargement 14 and the port 16. The ports 15 and 16 being thus connected, form a by-pass for the fluid from the high pressure side of the system to the low pressure side. It is to be noted, however, that the by-passing of the fluid is accomplished under a relatively low pressure, namely, that resulting from the force of the spring 25 in its compressed condition. As before stated, the spring 25 may be a light spring since, in the normal position of the valve plunger, it need be strong enough only to oppose the difference between the opposing forces on the pistons 22 and 23 under the predetermined maximum operating pressure.

The plunger 21 remains in its left-hand position until the pressure on the high pressure side of the system decreases to a value such that the spring 25 can reset the plunger to its illustrated position. The first result of the re-set (right-hand) movement of the plunger, is the closing of the by-passing connection between the ports 15 and 16 which is effected by the covering of the hole 18 communicating with the enlargement 14. Although a parallel passage is still open behind the piston 22 and through the passage 29, this also is soon closed as the piston enters its reduced bore 20. Until the piston 22 enters the bore 20, however, the entire force against the piston 23 must be less than the force exerted by the spring 25. After the piston 22 enters the bore 20, the spring 25 need overcome only the difference between the forces exerted on the pistons 22 and 23, respectively. The passage 29 permits the fluid in the bore 20 behind the piston 22 to be discharged into the low pressure port 16.

It will be apparent from the foregoing description that my invention differs from the ordinary spring-loaded relief valve in that the pressure on the fluid to be relieved actually assists the spring in maintaining the relief valve closed. When the light differential force exerted on the large piston exceeds the force of the spring, the movement of the plunger relieves the pressure assisting the spring and then by-passes the high pressure side of the system to the low pressure side. Because of the comparatively small strength required of the spring 25, due to the assistance of the smaller piston in opposing the effect of the pressure to be relieved on the piston 23, the fluid traversing the valve when in by-passing position is under quite a low pressure. This result is highly desirable, as previously pointed out, and the invention thus constitutes a distinct improvement over relief valves of the spring-loaded plunger type.

Although I have illustrated and described herein but one preferred embodiment of the invention, it will be recognized that changes in the construction disclosed may be made without departing from the spirit of the invention or the scope of the appended claims.

I claim:

1. In a relief valve, a cylinder, means for admitting fluid under pressure to said cylinder, means for relieving fluid from said cylinder including a discharge port and a piston valve subject to the pressure of said fluid, said valve normally covering said discharge port, and a piston in said cylinder having opposed faces one of which is subject to the pressure of fluid admitted to the cylinder, said piston being thereby effective to oppose movement of said piston valve to open the discharge port, and means operative on predetermined movement of said valve to admit fluid from said cylinder to the other face of said piston.

2. In a relief valve, a cylinder, high pressure and low pressure ports communicating with said cylinder, a piston slidable in said cylinder normally closing the low pressure port and subject to be moved by the pressure in the cylinder to open the low pressure port, means for yieldingly opposing such movement of said piston, a second piston slidable in said cylinder, connected to the first-mentioned piston and having opposed faces one of which is also subject to the pressure in the cylinder but is smaller in area than the first mentioned piston and effective thereby to oppose movement of the first-mentioned piston, and means whereby the pressures on both faces of the second-mentioned piston are equalized after a predetermined movement thereof.

3. A relief valve comprising a casing, a bore therein, pressure and relief ports intersecting said bore, a piston slidable in said bore, said piston being actuable by the pressure in the cylinder and normally closing the relief port but movable to a position in which the relief port is open, means yieldingly opposing movement of the piston in response to said pressure, a second piston slidable in said bore, connected to said first piston and having two faces one of which is effective under the pressure in the cylinder to oppose movement of the first piston, said second piston being smaller in area than the first, and means whereby the other face of the second piston is subjected to the pressure in the cylinder after predetermined movement of the first piston.

4. The apparatus defined by claim 3 wherein said means last mentioned includes a fluid passage opened on initial movement of the second piston to equalize the pressures on opposite sides thereof and terminate the opposition to further movement of the first piston.

5. A relief valve comprising a cylinder having pressure and relief ports, a piston valve slidable in the cylinder and actuable by the pressure therein to open the relief port, yielding means for normally so positioning the piston valve as to close the relief port, a second piston slidable in the cylinder having two faces, one exerting a differential force on the piston valve under the pressure in the cylinder, said second piston having a smaller effective area exposed to said pressure than the piston valve, and means operative on predetermined movement of said piston to subject the other face thereof to the pressure in the cylinder to balance said differential force.

6. A relief valve comprising a pair of spaced pistons connected for simultaneous reciprocation in a cylinder, high pressure and low pressure ports communicating with the cylinder and being spaced longitudinally thereof but adapted to be placed in communication when the pistons are in one position, one of said pistons being larger than the other and normally overlying the low pressure port, said pistons being subject differentially to the pressure in the cylinder whereby only the difference in their areas is effective to cause movement thereof, and an enlargement in the cylinder for equalizing the pressure on opposite sides of the smaller piston after a predetermined movement thereof.

7. In a relief valve, pressure and relief ports, a piston valve reciprocable in a cylinder, normally closing the relief port, and actuable by the pressure in the cylinder to open the relief port, means for yieldingly opposing movement of the piston valve to open the relief port, a fluid check including a piston having two faces smaller than the valve piston, connected thereto and reciprocable in a cylinder with one of said faces subject to the pressure in the cylinder for further opposing such movement of the valve piston, and means for subjecting the other face of said fluid check piston to the pressure in the cylinder upon a predetermined movement of the valve piston.

8. In a relief valve, a high pressure port, a low pressure port, a piston valve controlling communication between said ports and actuable by the pressure in the high pressure port to open the low pressure port, a hydraulic check opposing such movement of the piston valve, including a cylinder smaller than the piston valve having a piston with two faces reciprocable therein, connected to the piston valve with one of said faces subject to the pressure in the high pressure port, said cylinder having means for subjecting the other face of said check piston to the pressure in the high pressure port on predetermined movement of the valve piston.

9. In a relief valve, a cylinder having pressure and relief ports, a piston valve slidable in the cylinder under the pressure in the pressure port to open the relief port, means normally positioning the valve to close the relief port, said valve having a check piston attached thereto and movable in a cylinder with one face open to the pressure in the pressure port, said check piston being dimensioned to restrain the valve piston with a smaller differential force than is exerted on the valve tending to move it to open the relief port, and means for subjecting the other face of the check piston to the pressure in the pressure port on a predetermined movement of the piston valve.

10. A hydraulic relief valve comprising a cylinder, a pair of spaced connected pistons therein, one of said pistons being larger than the other, a high pressure port in said cylinder disposed between the pistons when the latter are in normal position, a low pressure port closed by the larger piston when in normal position, whereby the pressure in the cylinder is effective upon the difference in the areas of the two pistons to move them and connect the high pressure and low pressure ports, and means effective upon a predetermined movement of the pistons for neutralizing the differential pressure to which the smaller is normally subject, whereby to increase the area effective for holding the valve in operated position and thereby decreasing the pressure exerted on the fluid traversing the valve.

THOMAS C. KANE.